July 3, 1962 HIROSHI IWAMURA 3,042,753
MAGNETIC RECORDER
Filed Nov. 10, 1960
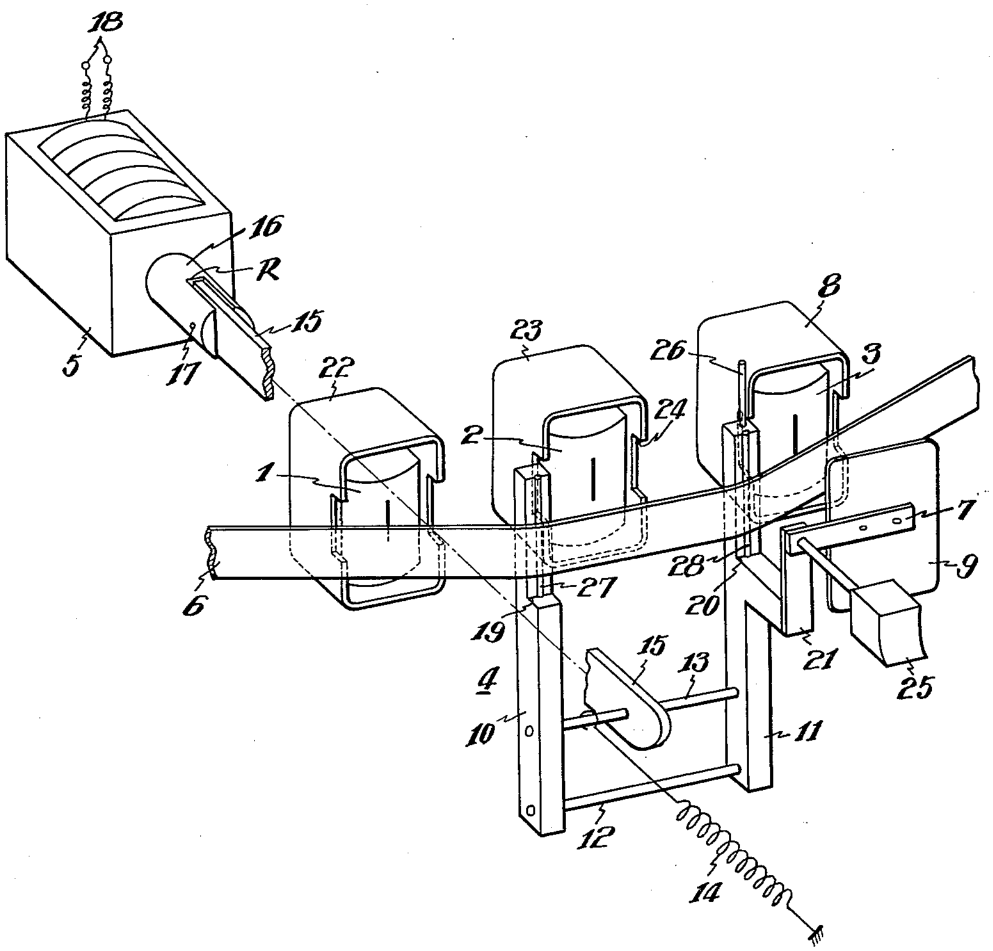
Inventor
Hiroshi Iwamura
by Hill Sherman Meroni Gross & Simpson
Attys.

United States Patent Office 3,042,753

Patented July 3, 1962

3,042,753
MAGNETIC RECORDER

Hiroshi Iwamura, Tokyo, Japan, assignor to Nippon Denkionkyo Kabushikikaisha, Tokyo, Japan, a corporation of Japan Filed Nov. 10, 1960, Ser. No. 68,402
Claims priority, application Japan May 23, 1960
6 Claims. (Cl. 179—100.2)

This invention relates to a magnetic recorder, and more particularly to a magnetic tape recorder having an improved tape shifter.

In the magnetic recorder it has been usual to shift and separate a magnetic medium such as a magnetic tape from a magnetic head to avoid wear of both at high speed operation such as rewind or fast forward operation. For this reason, it is difficult to magnetically shield the magnetic head at the front thereof. Shielding is desirable to avoid noise which may otherwise be introduced by stray magnetic fields impinging on the head.

Accordingly it is a principal object of this invention to provide a magnetic recorder in which tape shifting and magnetic head shielding can be achieved automatically and remotely controlled by simple means. It is another object of this invention to provide a magnetic tape recorder in which monitoring to determine whether a tape portion travelling before the recording or reproducing magnetic head has a record can be easily achieved in the rewind or fast forward operation when the magnetic tape is shifted from the magnetic head.

It is further object of this invention to provide a magnetic tape recorder in which the stop operation can be smoothly achieved from the rewind or fast forward mode without producing any undesired noise.

Further objects, features and advantages of this invention will be more apparent from the following description taken in connection with the accompanying drawing the single FIGURE of which shows a perspective view of a magnetic tape recorder, by way of example, according to this invention.

Referring to the drawing, 1 is an erasing head, 2 shows a recording head and 3 a reproducing or playback head. 4 represents generally a tape shifter and 5 and electromagnetic solenoid for operating the tape shifter.

In accordance with this invention, on the tape shifter 4 which pushes the magnetic tape 6 towards the magnetic heads 1, 2 and 3 is mounted a resilient arm 7 to which a front cover 9 of a magnetic shield case 8 is attached. The front cover 9 is made of a magnetic material and cooperates with the shield case 8.

The shifter 4 and means for operating the same may be constructed in any desired manner although it is composed of, in this example, a pair of members 10 and 11 which are disposed at the neighbourhood of the spaces respectively formed between the magnetic heads 1 and 2, and 2 and 3. A cross rod 13 connects the two members 10 and 11 to form a frame the lower part of which is journaled with a stationary axis 12. To the cross rod 13 is connected one end of a lever 15 the other end of which is connected to the armature 16 of the solenoid 5. 14 shows a shift spring. The armature 16 of the solenoid 5 has a recess R vertically cut into which the other end of the lever 15 is inserted and the two are pivoted by means of a pin 17 so that the lever 15 can be freely moved in the vertical plane. 18 shows a source terminal of the solenoid 5.

On the upper part of the members 10 and 11 of the shifter 4 are respectively formed vertical recesses 19 and 20 the faces of which are respectively provided with shifter bars 27 and 28 made of, for example glass bar material, and which receive and guide the tape 6 during rewind and fast forward operation.

On the member 11 is formed a bracket 21 to which one end of the resilient arm 7 is attached. The resilient arm 7 has the shield front cover 9 on the free end thereof. The magnetic shield case 8 for reproducing head 3 may preferably be made by laminating a high permeability permalloy sheet and a copper plate such as a three-sheet laminating plate of Permalloy-copper-Permalloy plates. The shield front cover 9 may also be made by the similar material. The resilient arm 7 may be made by a plate material as a Phosphor bronze plate having proper resiliency. The recording head 2 has a magnetic shield case 23 which may preferably be made by a Permalloy plate. The erasing head 1 has a magnetic shield case 22 which may preferably be made by a copper plate.

In a heretofore known ordinary magnetic tape recorder, the solenoid is arranged and energized at the rewind and fast forward operation and it is deenergized at stop operation. By this operation, the shifting action is released immediately during stop operation, and the tape instantaneously comes into contact with the magnetic heads. At this time a tape having a signal recorded thereon is still moving because of the momentum of the driving parts so that a loud speaker of the tape recorder will produce loud noises.

According to this invention, on the contrary, the solenoid 5 is energized only during recording or playback operation and deenergized during rewind or fast forward operation and standstill condition. When the solenoid 5 is deenergized, the shifter 4 is rotated around the stationary shaft 12 by means of the spring 14 so that the tape 6 is separated from the respective magnetic heads 1, 2 and 3 by the members 10 and 11 and travels smoothly passing over the glass bars 27 and 28. In recording or reproducing the solenoid 5 is energized to rotate the shifter 4 in the reverse direction and the tape 6 comes to contact with magnetic heads. Therefore, the recorder is changed to standstill condition from rewind or fast forward operation without undesired noise which will otherwise be produced as has previously been explained.

At the same time, the shield front cover 9 will also come to contact with the front surface of the shield case 8 of the reproducing head 3. The magnetic tape 6 continues to travel through a little recess 24 formed in the shield case 8. The magnetic head 3 is entirely and magnetically shielded by cooperation of the shield case 8 and the shield front cover 9. The above tape shifting and magntic head shielding can be achieved automatically or remotely controlled.

It will be appreciated that the shield front cover 9 is exactly fitted with the shield case 8 by aid of the resiliency of the arm 7, even if a slight disarrangement of the front cover 9 to the shield case 8 exists, so that the shielding effect of the reproducing heads will be exactly obtained.

In order to locate the portion of the tape where a signal is recorded in the rewind or fast forward operation, it is desirable to easily close or contact the tape to the reproducing head as desired.

For this purpose means for pushing the member 11 to rotate against the spring 14 are provided. In this instance, a push member such as a button 25 or push bar 26 is attached to the shifter 4, especially to the upper part of the member 11 so that the push button 25 or the push bar 26 can be manually pushed to rotate the shifter 4 for a desired duration of time as a user desires, whereby a boundary of a recorded signal on the tape can easily be located.

In some cases, either one of the magnetic heads 2 and 3, can be used as a recording and reproducing head. In other cases, another magnetic head can be interposed between the heads 2 and 3 for a quarter track stereo system.

Similar shielding cover devices may also be applied for the other heads 1 and 2 (other than 3), if desired.

It will be apparent that many modifications and variations can be effected without departing from the scope of the novel concepts of this invention.

What is claimed is:

1. A magnetic recorder comprising an erasing magnetic head, a recording and reproducing magnetic head, a shield case for magnetically shielding at least one of said magnetic heads, a shifter for shifting a magnetic medium which is travelling past said magnetic heads to separate the medium from said magnetic heads, a shift spring urging said shifter in the direction in which said magnetic medium is separated from said magnetic heads, an electromagnetic means which is arranged and energized to move said shifter against said shift spring so as to contact said magnetic medium with said magnetic heads, a resilient arm which is mounted on said shifter, and a shield front cover attached to said resilient arm for magnetic shielding of the front face of said magnetic head having said shield case when contacted with the front face of said shield case.

2. A magnetic recorder comprising an erasing magnetic head, a recording magnetic head, a reproducing magnetic head, a shield case for magnetically shielding at least one of said magnetic heads, a shifter for shifting a magnetic medium which is travelling past said magnetic heads to separate the medium from said magnetic heads, a shift spring urging said shifter in the direction in which said magnetic medium is separated from said magnetic heads, an electromagnetic means which is arranged and energized to move said shifter against said shift spring so as to contact said magnetic medium with said magnetic heads, a resilient arm which is mounted on said shifter, and a shield front cover attached to said resilient arm for magnetic shielding of the front face of said magnetic head having said shield case when contacted with the front face of said shield case.

3. A magnetic recorder comprising an erasing magnetic head, a recording and reproducing magnetic head, a shield case for magnetically shielding said recording and reproducing magnetic head, a shifter for shifting a magnetic medium travelling past said magnetic heads to separate the medium from said magnetic heads, a shift spring urging said shifter in the direction in which said magnetic medium is separated from said magnetic heads, an electromagnetic means which is arranged and energized to move said shifter against said shift spring so as to contact said magnetic medium with said magnetic heads, a resilient arm which is mounted on said shifter, a shield front cover attached to said resilient arm for serving magnetic shielding of the front case of said recording and reproducing magnetic head when contacted with the front face of said shield case.

4. A magnetic recorder comprising an erasing magnetic head, a recording magnetic head, a reproducing magnetic head, a shield case for magnetically shielding said reproducing magnetic head, a shifter for shifting a magnetic medium travelling past said magnetic heads to separate the medium from said magnetic heads, a shift spring urging said shifter in the direction in which said magnetic medium is separated from said magnetic heads, an electromagnetic means which is arranged and energized to move said shifter against said shift spring so as to contact said magnetic medium with said magnetic heads, a resilient arm which is mounted on said shifter, and a shield front cover attached to said resilient arm for magnetic shielding of the front face of said reproducing magnetic head when contacted with the front face of said shield case.

5. A magnetic recorder comprising an erasing magnetic head, a recording magnetic head, a reproducing magnetic head, a shield case for magnetically shielding said reproducing magnetic head, a shifter for shifting a magnetic medium travelling past said magnetic heads to separate the medium from said magnetic heads, a shift spring urging said shifter in the direction in which said magnetic medium is separated from said magnetic medium, an electromagnetic means which is arranged and energized to move said shifter against said shift spring so as to contact said magnetic medium with said magnetic heads, a resilient arm which is mounted on said shifter, a shield front cover atached to said resilient arm, and a push member attached to said shifter for being pushed manually to move said shifter against said shift spring so that a recorded portion of said magnetic medium can be located by bringing said magnetic medium into contact with said reproducing head during rewind and fast forward operation of said magnetic medium.

6. A magnetic recorder comprising an erasing magnetic head, a recording magnetic head, a reproducing magnetic head, a shield case for magnetically shielding said reproducing magnetic head, a shifter which is provided with a pair of members for shifting a magnetic medium travelling past said magnetic heads, a cross bar connecting said members, a stationary shaft pivotally mounting said members for shifting said magnetic medium to separate the medium from said magnetic heads, said magnetic medium contacting with surfaces of said members which are directed away from said magnetic heads, a shift spring urging said shifter to pivot in the direction in which said magnetic medium is separated from said magnetc heads, an electromagnetic means which is arranged and energized to pivot said shifter against said spring so as to contact said magnetic medium with said magnetic heads, a resilient arm which is mounted on said shifter, a shield front cover attached to said resilient arm, and a push member attached to said shifter for being pushed manually to rotate said shifter against said shift spring so that a recorded portion of said magnetic medium can be located by bringing said magnetic medium into contact with said reproducing head during rewind and fast forward operation of said magnetic medium.

References Cited in the file of this patent

UNITED STATES PATENTS

| | | |
|---|---|---|
| 2,560,254 | Shickel | July 10, 1951 |
| 2,595,197 | Kihlow | Apr. 29, 1952 |
| 2,862,715 | MacDonald | Dec. 2, 1958 |
| 2,975,242 | Fischer | Mar. 14, 1961 |

FOREIGN PATENTS

| | | |
|---|---|---|
| 1,166,714 | France | June 23, 1958 |